United States Patent [19]

Watanabe

[11] 4,218,630
[45] Aug. 19, 1980

[54] INSULATION STATOR FOR END TURN WINDINGS OF ELECTRIC ROTARY MACHINE

[75] Inventor: Takashi Watanabe, Ibaraki, Japan

[73] Assignee: Hitachi, Ltd., Japan

[21] Appl. No.: 29,839

[22] Filed: Apr. 13, 1979

[30] Foreign Application Priority Data

Apr. 15, 1978 [JP]  Japan .................................. 53/43809

[51] Int. Cl.² ............................................. H02K 3/46
[52] U.S. Cl. ................................................... 310/260
[58] Field of Search ...................... 310/194, 260, 270;
336/185, 197, 199, 206, 207

[56] References Cited

U.S. PATENT DOCUMENTS

| | | | |
|---|---|---|---|
| 3,038,093 | 6/1962 | Needham et al. ..................... | 310/179 |
| 3,439,205 | 4/1969 | Houtman ........................... | 310/260 X |
| 3,575,623 | 4/1971 | Stine ..................................... | 310/260 |
| 3,909,648 | 9/1975 | Clark ................................... | 310/260 |
| 3,912,957 | 10/1975 | Reynolds .......................... | 310/260 X |

*Primary Examiner*—Mark O. Budd
*Attorney, Agent, or Firm*—Craig & Antonelli

[57] ABSTRACT

There is disclosed a stator structure of an electric rotary machine with a stator winding composed of at least two phase coils wound on a stator core through respective slots formed in the core. In the stator, an elongated insulating strap layer is interleaved between two different phase coils at sites outside the slots such that the width of the strap layer extends in the longitudinal direction of the slots. A plurality of binding yarns pierce through the insulating strap at a distance from one of the opposite side edges which is farther than the other from the slots and bind the stator winding together with a portion of the strap layer lying between each of the pierced portions and said one side edge.

12 Claims, 6 Drawing Figures

INSULATION STATOR FOR END TURN WINDINGS OF ELECTRIC ROTARY MACHINE

BACKGROUND OF THE INVENTION

The present invention relates to a stator structure of an electric rotary machine and more particularly, to attachment of inter-phase insulating layers which are interleaved, in the vicinity of the stator outer end surface, between different phases of the stator winding of a high voltage and small-sized motor.

In the high voltage and small-sized motor to be applied with a phase voltage of more than 300 volts, corona discharge may often occur between different phase coils of the stator winding in the vicinity of the stator outer end surface. Such a corona discharge causes rapid deterioration in insulating coatings of the coil wire conductors and eventual layer short-circuiting thereat, frequently resulting in burning troubles of motors. This is attributable to the fact that the insulating coating, for example, enamel coating of the wire conductor undergoes rapid deterioration when the applied voltage exceeds 350 to 370 volts. In order to prevent the insulation deterioration due to the corona discharge, according to well known practice, insulating layers made of polyester such as a product sold under a trade mark of "Mylar" manufactured by Du Pont are interleaved between different phase coils of a stator winding portion in the vicinity of the stator outer end surface (this stator winding portion being referred to as coil structure end portion hereinafter). For example, U.S. Pat. No. 3,038,093 to Robert L. Needham et al discloses the manner in which a plurality of pieces of insulating member are applied at sites selected for insulation purposes.

Generally, in the type of lap winding whose winding is effected manually, the attachment of the inter-phase insulating members is relatively easy. But, because of extremely poor efficiency in work of winding and consequent high cost, lap winding is employed only for the small scale production, for example, production of large-size electric rotary machines.

Therefore, for the large scale production, concentric winding is usually employed which is suitable for winding by means of winding machine with high efficiency in work of winding. To conform to concentric winding, as will be detailed later, an attempt to use insulating strap layers as the inter-phase insulating members for the coil structure end portion was made, in which the insulating strap layers which extend in the circumferential direction of the stator were interleaved between different phase coils in the vicinity of the stator outer end surface. This attempt ensures that the insulating strap can be interleaved completely between different phase coils before the coil structure end portion is forced to deform radially and outwardly of the stator for its shaping and the insulating strap and a bundle of coil wire conductors are then bound with binding yarns. When bound with the binding yarns, however, the insulating strap is also shifted or displaced in part radially and outwardly and as a result, it cannot be interleaved completely or fitted between different phase coils any more. Consequently, as will be detailed later, insulating coatings of wire conductors of different phase coils come in direct contact with each other in the vicinity of the stator outer end surface and corona discharges will occur. For these reasons, rapid deterioration in coil insulation was experienced, resulting in decrease in lifetime of the product or, to extremities, defective products.

Additionally, as will be detailed later, another attempt to use comb-shaped insulating straps each having a plurality of integral projections at its side edge close to the stator outer end surface was made, in which the comb-shaped insulating straps were interleaved between different phase coils by deeply inserting the projections into spaces between different phase coils or into slots of the stator. This attempt ensures that the insulating strap, when bound with binding yarns, will not be displaced radially and outwardly of the stator in contrast to the former attempt, thereby preventing deterioration in insulation of coatings of the coil wire conductors which is caused by corona discharges. However, roots of the projections of the comb-shaped insulating strap were liable to be damaged mechanically, resulting in difficulties with interposition of the strap between different phase coils. With thick comb-shaped insulating straps of increased mechanical strength, it was possible to interleave the thick straps between different phase coils with ease; but when interleaved between different phase coils extending around the circumference of the stator, the thick insulating strap of less flexibility prevented the phase coils from being smoothly shaped radially and outwardly of the stator. If shaped, the phase coils experienced to recover inwardly.

SUMMARY OF THE INVENTION

The present invention therefore intends to obviate drawbacks of the prior art or of the trials and has for its object to provide a stator of an electric rotary machine which can prevent deterioration in insulation of different phase coils at the coil structure end portion and ensure easy interposition of insulating straps between different phase coils.

To attain the above object, according to the invention, in a stator structure of an electric rotary machine with a stator winding constituted by at least two phase coils wound on a stator core through respective slots formed therein, an elongated insulating strap layer is interleaved between different phase coils outside the slots such that the width of the strap layer extends in the longitudinal direction of the slots. Each binding yarn pierces through the insulating strap at an intermediate point in a widthwise path of the strap and binds the stator winding together with the portion of the strap lying between the point pierced by the binding yarn and one of the opposite edges which is further from the slots than the other one.

DESCRIPTION OF THE PREFERRED EMBODIMENTS

Figure 1:
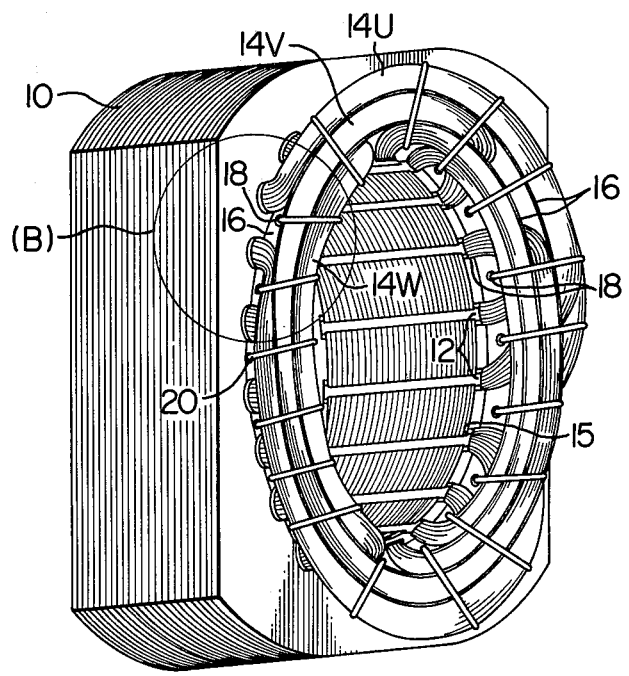
FIG. 1 is a perspective view of a preferred embodiment of the coil structure end portion of the stator according to the present invention.
Figure 2:
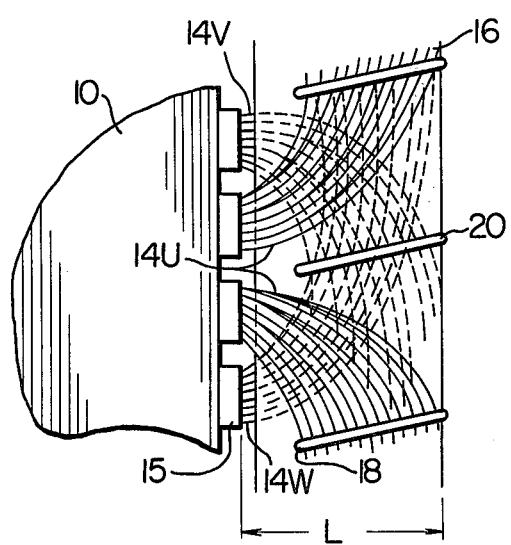
FIG. 2 is an enlarged front view showing a portion of the coil structure end portion of the stator shown in FIG. 1.
Figure 3:
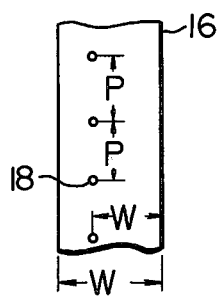
FIG. 3 is a partial front view showing a preferred embodiment of an insulating strap member according to the invention.

Referring now to FIGS. 1 to 3, a preferred embodiment of the present invention will be described, in which the invention is applied to the stator of a small-sized three-phase electric motor.

As shown therein, a stator core 10 is formed with a plurality of slots 12 within which three phase coils 14U, 14V and 14W constituting a stator winding 14 are wound in a concentric fashion. Reference numeral 15 designates an insulating member arranged within the slot. Between the phase coils 14U and 14V and between the phase coils 14V and 14W are interleaved thin insulating straps 16, 16 which extend in the circumferential direction of the stator. The strap 16 is made of Mylar, for example, and has a plurality of perforations 18 which are spaced and aligned in the longitudinal direction at a certain distance from one of the opposite side edges of the strap so that binding yarns 20 can be passed through the respective perforations 18. After shaping the coils, a part of the insulating strap and a bundle of coil wire conductors of the stator winding are bound integrally by the binding yarns 20 which pass through the respective perforations 18 so that the coils may be held in a given place and the insulating straps 16, 16 may be mated with the coils. As viewed from an elevation of FIG. 2, one front insulating strap 16 alone is depicted and the other rear insulating strap is not shown for clarity of illustration.

According to this embodiment, since the insulating strap 16 is formed only with the perforations 18 for passing therethrough the binding yarns which are spaced and aligned in the longitudinal direction at a certain distance from one of the opposite side edges of the strap, the mechanical strength of the strap will not be impaired and the strap, although thin, can be interleaved between different phase coils with ease. The thin insulating strap 16 also contributes to easy shaping of the coils.

Figure 4:
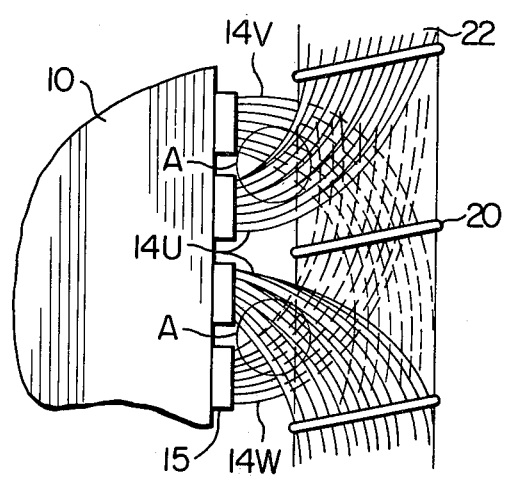
FIG. 4 is a partial front view of a stator incorporating a trial insulating strap prepared in the course of achieving the FIG. 3 strap preferably embodying the invention.
Figure 5:
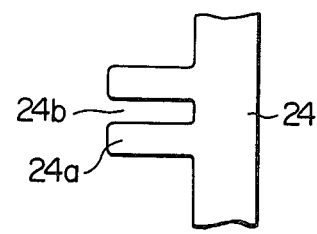
FIG. 5 is a partial front view of a trial comb-shaped insulating strap prepared in the course of achieving the FIG. 3 strap preferably embodying the invention.

As has already been described, attempts to use insulating straps as shown in FIGS. 4 and 5 have been experienced in the course of achieving the preferably embodied insulating strap. Where each binding yarn 20 is applied throughout the width of an insulating strap 22 to bind the bundle of coil wire conductors of the stator winding together with the portion across the whole width of the strap, as in the case of FIG. 4, the insulating strap 22 can be interleaved or filled completely between different phase coils before the phase coils are forced to deform radially and outwardly of the stator for their shaping and the insulating strap 22 and the bundle of coil wire conductors are then bound with the binding yarns 20. When bound with the binding yarns 20, however, the insulating strap 22 may be displaced radially and outwardly and as a result, it cannot be interleaved between different phase coils at site A, for example, shown in FIG. 4. Consequently, insulating coatings of the wire conductors of different phase coils come in direct contact with each other and corona discharges will occur at site A as described above. For these reasons, rapid deterioration of the insulation of the coil conductor wire was experienced.

Also, as has already been described, a trial comb-shaped insulating strap 24 as shown in FIG. 5 was used, in which projections 24a were interleaved between different phase coils at site A and each binding yarn 20 was passed through each recess 24b. With this comb-shaped insulating strap 24, the inter-phase coil insulating member will not be displaced at site A in contrast to the case of FIG. 4, thereby ensuring prevention of the insulation deterioration. However, one side edge of the insulating strap 24 which is close to the stator end surface is formed with the projections 24a which are separated by the recesses 24b and these projections are liable to be damaged mechanically, resulting in difficulties with interposition of the comb-shaped strap between different phase coils as described already.

It will be appreciated that the preferred embodiment described above with reference to FIGS. 1 to 3 may eliminate such disadvantages as of the trial insulating straps of FIGS. 4 and 5. In the preferred embodiment, the insulating strap 16 is formed with perforations 18 which are longitudinally aligned at a distance from one of the opposite side edges of the strap. When binding the bundle of coil wire conductors following shaping of the coil structure end portion, the binding yarns 20 are passed through the respective perforations 18 to bind the insulating strap 16 partly together with the coil bundle. Consequently, the insulating strap 16 will not be displaced or shifted radially and outwardly of the stator in the binding work process to thereby ensure that the thin insulating strap can be interleaved between different phase coils at site A shown in FIG. 4. Where the insulating strap 16 has a width W which is 1.0 to 1.2 times a length L of the axially protruding coil structure end portion, and a distance w between the perforation 18 and one of the opposite side edges of the insulating strap 16 (right hand side edge) which is farther from the stator end surface is 0.5 to 0.9 times the width W, the insulating strap 16, when bound with the binding yarns 20, is rather positively drawn to the stator core 10 so that it is possible to completely prevent the coil wire conductors of different phase coils from coming in direct contact with each other.

Where a pitch P between adjoining perforations 18 is selected to be 1 or 2 times the pitch between adjoining slots 12, the binding yarn 20 can be applied on the insulating strap with ease. To make it easy to pass the binding yarn 20 through the perforation 18, it is desirable for the perforation to have a large diameter. An excessively diametered perforation, however, allows the insulating strap to freely displace, adversely affecting the insulation between different phase coils. Therefore, the diameter is desirable to be less than 2 mm.

It is not always necessary that the insulating strap 16 has been prepared with the perforations 18 formed therein. Since the insulating strap 16 is a thin Mylar film, a needle with binding yarn may of course pierce through the film to make it possible to bind the film with the binding yarn passed through a perforation thus pierced.

In the foregoing preferred embodiment, the invention was applied to the stator of three-phase motor but it is clear that the invention may be applied to the winding of single-phase motors.

Figure 6:
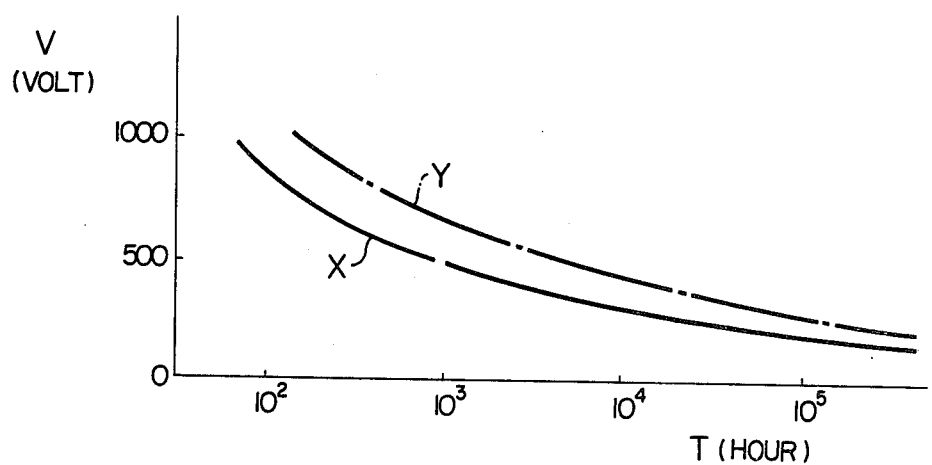
FIG. 6 is a graphic representation showing the relation between voltage applied and insulation lifetime.

Experimental data concerning the relation between application voltage V and insulation lifetime T of coils were obtained in connection with the preferred embodiment of the invention as shown in FIGS. 1 to 3 and the construction of FIG. 4. Results are plotted at graphs in FIG. 6. As will be seen from FIG. 6, curve X representative of FIG. 4 construction wherein wire conductors of different phase coils are in direct contact with each other at site A shows a life of about 1,000 hours for 500 volts applied, for example, whereas curve Y representative of the preferred embodiment of the present invention shows a considerably prolonged life for the same application voltage.

I claim:

1. A stator of an electric rotary machine, comprising:
   a stator core formed with a plurality of slots;
   a stator winding composed of at least two different phase coils wound on said core through said slots;
   an elongated insulating strap layer having a width and interleaved between said two different phase coils at sites outside said slots in a manner so that the width of said strap layer extends in the longitudinal direction of said respective slots; and
   a plurality of binding yarns for binding said stator winding together with said insulating strap layer at sites outside said slots, each of said binding yarns being arranged in a manner so that it pierces through said insulating strap layer at a point at a predetermined distance from one of the opposite side edges of said strap layer which is farther from said slot than the other end edge and binds said stator winding together with a portion of said strap layer lying between the pierced point and said one side edge.

2. A stator according to claim 1, wherein said insulating strap layer is preformed with perforations for passing therethrough said respective binding yarns.

3. A stator according to claim 1 or 2, wherein said width of said insulating strap layer is selected to has a predetermined rate with respect to a length of said stator winding protruding from said slot axially and outwardly of said stator.

4. A stator according to claim 3, wherein said predetermined rate is about 1.0 to 1.2 times said protruding length of said stator winding.

5. A stator according to claim 2, wherein said perforations are spaced and aligned in the longitudinal direction of said insulating strap layer and the distance between said respective perforations and said one side edge has a predetermined rate with respect to said width.

6. A stator according to claim 5, wherein said predetermined rate of said distance is about 0.5 to 0.9 times said width.

7. A stator according to claim 2 or 5, wherein the diameter of each of said perforations is less than 2 mm.

8. A stator according to claim 5, wherein said perforations are aligned with a predetermined pitch.

9. A stator according to claim 8, wherein said predetermined pitch is a predetermined integer times a pitch of said slots in the circumferential direction of said core.

10. A stator according to claim 8, wherein said predetermined pitch is 1.0 times the pitch of said slots in the circumferential direction of said core.

11. A stator according to claim 8, wherein said predetermined pitch is 2.0 times the pitch of said slots in the circumferential direction of said core.

12. A stator of an electric rotary machine, comprising:
    a stator core formed with a plurality of slots;
    a stator winding composed of three phase coils wound on said core through said slots;
    two insulating strap layers each having a width and a length and respectively interleaved between two different ones of said three phase coils at sites outside said slots in a manner so that the width of each of said strap layer extends in the longitudinal direction of said slots and the length of each of said strap layers continuously elongates in the circumferential direction of said core, said width of each of said insulating strap layers being about 1.0 to 1.2 times a length of said stator winding protruding from said slot axially and outwardly of said stator;
    a plurality of yarns for binding the coils; and
    perforations preformed in each of said insulating strap layers, said perforations being spaced and aligned in the longitudinal direction of said strap layer, wherein the distance between each of said perforations and one of the opposite side edges of said strap layer which is farther from said slot than the other is about 0.5 to 0.9 times said width of said insulating strap layer, said perforations are aligned with a pitch which is a predetermined integer times a pitch of said slots in the circumferential direction of said core, and each of said binding yarns is arranged in a manner so that it pierces through each of said perforations of each of said strap layers and binds said stator winding together with a portion of the associated strap layer lying between the pierced perforation and said one side edge.

* * * * *